US009753449B2

(12) United States Patent
Sato et al.

(10) Patent No.: US 9,753,449 B2
(45) Date of Patent: Sep. 5, 2017

(54) NUMERICAL CONTROL DEVICE

(71) Applicant: Mitsubishi Electric Corporation, Tokyo (JP)

(72) Inventors: Tomonori Sato, Tokyo (JP); Toru Takeyama, Tokyo (JP); Kenji Nishiwaki, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 237 days.

(21) Appl. No.: 14/769,317

(22) PCT Filed: Apr. 8, 2013

(86) PCT No.: PCT/JP2013/060647
§ 371 (c)(1),
(2) Date: Aug. 20, 2015

(87) PCT Pub. No.: WO2014/167636
PCT Pub. Date: Oct. 16, 2014

(65) Prior Publication Data
US 2015/0378347 A1 Dec. 31, 2015

(51) Int. Cl.
*G05B 19/402* (2006.01)
*G05B 19/4063* (2006.01)

(52) U.S. Cl.
CPC ....... *G05B 19/402* (2013.01); *G05B 19/4063* (2013.01); *G05B 2219/23431* (2013.01); *Y02P 90/265* (2015.11)

(58) Field of Classification Search
CPC .............. G05B 19/402; G05B 19/4063; G05B 2219/23431; Y02P 90/265
See application file for complete search history.

(56) References Cited

U.S. PATENT DOCUMENTS 4,131,837 A * 12/1978 Whetham .......... G05B 19/4065
318/561
5,008,834 A 4/1991 Mizuno et al.
(Continued)

FOREIGN PATENT DOCUMENTS

JP 2-178710 A 7/1990
JP 05-073125 A 3/1993
(Continued)

OTHER PUBLICATIONS

International Search Report of PCT/JP2013/060647 dated Jun. 11, 2013 [PCT/ISA/210].

*Primary Examiner* — Ramesh Patel
(74) *Attorney, Agent, or Firm* — Sughrue Mion, PLLC; Richard C. Turner

(57) ABSTRACT

A numerical control device includes: a control unit controlling movement of shafts of a machine tool by a position command according to a machining program and acquiring position information on the shafts; a monitoring point determination unit determining a monitoring point in the machining program and a monitoring shaft according to the type of an instruction or an instruction related to travel described in the machining program; and a monitoring unit monitoring whether error or deviation based on the position information at the monitoring point of the monitoring shaft exceeds a predetermined threshold, wherein the control unit controls movement of the shafts based on the monitoring result of the monitoring unit, and the numerical control device further comprises an analysis unit presenting whether the cause of the error or deviation is a mechanical factor or a control factor based on the monitoring result and outputting the analysis result.

21 Claims, 6 Drawing Sheets

(56) References Cited

U.S. PATENT DOCUMENTS

| | | | |
|---|---|---|---|
| 5,822,212 A * | 10/1998 | Tanaka | G05B 19/4063 700/174 |
| 6,445,973 B1 * | 9/2002 | Sagasaki | G05B 19/408 700/169 |
| 6,618,632 B1 * | 9/2003 | Federl | G05B 23/0221 700/110 |
| 7,548,795 B2 * | 6/2009 | Sagasaki | G05B 19/4155 318/569 |
| 2004/0174130 A1 * | 9/2004 | Inoue | B23Q 17/09 318/569 |
| 2004/0251238 A1 * | 12/2004 | Ogata | B23H 7/20 219/69.12 |
| 2005/0241843 A1 | 11/2005 | Fujibayashi et al. | |
| 2006/0173571 A1 * | 8/2006 | Hosokawa | G05B 19/4063 700/177 |
| 2006/0173572 A1 * | 8/2006 | Sagasaki | G05B 19/4155 700/181 |
| 2008/0234857 A1 | 9/2008 | Endo et al. | |
| 2009/0228135 A1 * | 9/2009 | Nakamura | G05B 19/409 700/173 |
| 2012/0296462 A1 * | 11/2012 | Otsuki | G05B 19/4069 700/104 |
| 2015/0194805 A1 * | 7/2015 | Sagasaki | G05B 19/4062 318/569 |

FOREIGN PATENT DOCUMENTS

| | | |
|---|---|---|
| JP | 5-53594 B2 | 8/1993 |
| JP | 5-54131 B2 | 8/1993 |
| JP | 07-005908 A | 1/1995 |
| JP | 8-19939 A | 1/1996 |
| JP | 08-249030 A | 9/1996 |
| JP | 2004-102568 A | 4/2004 |
| JP | 2005-011203 A | 1/2005 |
| JP | 2005-316747 A | 11/2005 |
| JP | 3759881 B2 | 3/2006 |
| JP | 2006-99284 A | 4/2006 |
| JP | 2008-188694 A | 8/2008 |
| JP | 2008-234319 A | 10/2008 |
| JP | 2010-049361 A | 3/2010 |
| JP | 4441735 B2 | 3/2010 |

* cited by examiner

FIG. 3

| SELECTION NUMBER | | COMMAND TYPE | DETERMINATION METHOD OF COMMAND TYPE | DETAILS OF MONITORING POINT | SHAFT TO BE MONITORED | LOG DATA TO BE RECORDED |
|---|---|---|---|---|---|---|
| ✓ | 1 | ZERO RETURN | G28 | IMMEDIATELY AFTER ZERO RETURN | ZERO RETURN SHAFT | POSITION |
| ✓ | 2 | TOOL MEASUREMENT | G37, M111 | PREDETERMINED TIME BEFORE AND AFTER SENSOR IS TURNED ON | COMMAND SHAFT | POSITION |
|  | 3 | WORKPIECE MEASUREMENT | G31 |  | COMMAND SHAFT | POSITION |
| ✓ | 4 | TOOL REPLACEMENT | M6, T COMMAND | IMMEDIATELY AFTER REPLACEMENT, | MAIN SHAFT | POSITION, CURRENT |
| ✓ | 5 | WORKPIECE REPLACEMENT | M60 | IMMEDIATELY AFTER FIRST TRAVEL AFTER REPLACEMENT | ALL SHAFTS THAT DRIVE WORKPIECE | POSITION, CURRENT |
|  | 6 | OPPOSITE DIRECTION POSITIONING WITH RESPECT TO SAME POSITION | G0, AND REVERSAL OF TRAVEL DIRECTION | PREDETERMINED DISTANCE RANGE FROM RELEVANT POSITION | COMMAND SHAFT | POSITION, CURRENT |
|  | 7 | TRAVEL COMMAND TO REVERSE DIRECTION OF ANY SHAFT | CONTINUOUS TWO TRAVEL COMMANDS IN WHICH TRAVEL DIRECTION OF ANY SHAFT BECOMES OPPOSITE, AND EXTERNAL ANGLE BETWEEN CHANNELS FORM PREDETERMINED ANGLE OR LESS | PREDETERMINED TIME NEAR DIRECTION REVERSAL | DIRECTION REVERSAL SHAFT | POSITION, CURRENT |
| ✓ | 8 | ARC COMMAND TO REVERSE DIRECTION OF ANY SHAFT IN MIDDLE OF BLOCK | G02/03, AND QUADRANT SWITCHING AND PASSING | PREDETERMINED TIME NEAR DIRECTION REVERSAL | DIRECTION REVERSAL SHAFT | POSITION, CURRENT |
|  | 9 | FAST-FEED TRAVEL IN WHICH THERE IS DWELL COMMAND FOR PREDETERMINED TIME OR MORE IN NEXT BLOCK | G0 SUBSEQUENT TO G4 | PREDETERMINED TIME BEFORE AND AFTER END POINT | COMMAND SHAFT | POSITION |
|  | 10 | CUTTING FEED TRAVEL IN WHICH THERE IS DWELL COMMAND FOR PREDETERMINED TIME OR MORE IN NEXT BLOCK | G1 SUBSEQUENT TO G4 | PREDETERMINED TIME BEFORE AND AFTER END POINT | COMMAND SHAFT | POSITION |
|  | 11 | CONTROL MODE CHANGE (COORDINATE TRANSFORM) | G68, G69 | IMMEDIATELY AFTER CHANGE OR IMMEDIATELY AFTER SHAFT OF FIRST TRAVEL AFTER CHANGE | SHAFT TO BE CONTROLLED | POSITION |
|  | 12 | CONTROL MODE CHANGE (SYNCHRONOUS CONTROL) | G84/G80 G33/G0 |  | SHAFT TO BE CONTROLLED | POSITION |
|  | 13 | CONTROL MODE CHANGE (ACCELERATION AND DECELERATION) | G64/G61.1 |  | SHAFT TO BE CONTROLLED | POSITION |
| ✓ | 14 | CONTROL MODE CHANGE (POSITION/SPEED) | M101/M102 |  | SHAFT TO BE CONTROLLED | POSITION |
| ✓ | 15 | CHANGE OF CONTROL SHAFT | G110 |  | CHANGED SHAFT | POSITION |
|  | 16 | FINISH MACHINING CYCLE | FINISHING FIXED CYCLE G CODE | CUTTING FEED BLOCK DURING MACHINING CYCLE | ALL SHAFTS | POSITION |
|  | 17 | HOLE DRILLING | HOLE-DRILLING FIXED CYCLE G CODE (G81, G84, ETC.) | PREDETERMINED TIME OR PREDETERMINED DISTANCE BEFORE AND AFTER HOLE BOTTOM | Z SHAFT, MAIN SHAFT | POSITION, CURRENT |
|  | 18 | POCKET MACHINING | POCKET MACHINING CYCLE G CODE (G591, ETC.) | NEAR CORNER AT WHICH EXTERNAL ANGLE BETWEEN ADJACENT CHANNELS FORM PREDETERMINED ANGLE OR MORE | ALL SHAFTS | POSITION, CURRENT |
|  | 19 | MACHINING CYCLE | FIXED CYCLE G CODE | CUTTING FEED BLOCK IN WHICH THERE ARE FIRST AND LAST TRAVELS | ALL SHAFTS | POSITION |
| ✓ | 20 | TAPPING | G84 | WHOLE MACHINING CYCLE | COMMAND SHAFT, MAIN SHAFT | SYNCHRONIZATION ERROR, CURRENT |
|  | 21 | THREADING CYCLE | THREADING G CODE (G33, ETC.) | WHOLE CUTTING FEED BLOCK | COMMAND SHAFT, MAIN SHAFT | SYNCHRONIZATION ERROR |
| ✓ | 22 | PLURALITY OF SAME MACHINING CYCLES | MACHINING CYCLE G CODE | FIRST AND LAST MACHINING CYCLES | ALL SHAFTS | POSITION, CURRENT |
|  | 23 | ACCURACY DESIGNATION (POSITIONING ACCURACY) | TPOS COMMAND | PREDETERMINED DISTANCE BEFORE AND AFTER DESIGNATED END POINT | COMMAND SHAFT | POSITION |
|  | 24 | ACCURACY DESIGNATION (CIRCULARITY) | TCIRC COMMAND | WHOLE BLOCK | COMMAND SHAFT | POSITION |

FIG.4

```
N101 O1 (WORK NO1)
N102 G54 (WORKPIECE COORDINATE SYSTEM SELECTION 1)
N103 G17 (XY PLANE SELECTION)
N104 G91 G28 Z0 (ZERO RETURN OF Z SHAFT)(★)
N105 G91 G28 X0 Y0 (ZERO RETURN OF X SHAFT AND Y SHAFT)(★)
N106 T1 M6  (TOOL CHANGE: TOOL REPLACEMENT TO TOOL WITH TOOL NUMBER 1)(★)
N107 G43 H1 (TOOL OFFCET: CORRECT TOOL LENGTH WITH CORRECTION AMOUNT OF CORRECTION NUMBER 1)
N108 S3000 M3 (SPINDLE CW ROTATION: NORMAL ROTATION OF MAIN SHAFT)
N109 G90 G0 X-25. Y-10.
N110 G0 Z15.
N111 Z1.
N112 M8 (COOLANT ON: CUTTING FLUID ON)
N113 G1 Z-0.25 F3000.
N114 X25.
N115 Y10.
N116 X-25.
N117 M9 (COOLANT OFF: CUTTING FLUID OFF) M5 (SPINDLE STOP: MAIN SHAFT STOP)
N118 G0 Z15.
N119 G91 G28 X0Y0Z0 (ZERO RETURN OF X SHAFT, Y SHAFT, AND Z SHAFT)(★)
N120 (---HOLE DRILLING----------------)
N121 T2 M6 (TOOL CHANGE: TOOL REPLACEMENT TO TOOL WITH TOOL NUMBER 2)(★)
N122 G43 H2 (TOOL OFFCET: TOOL LENGTH CORRECTION)
N123 S3000 M3(SPINDLE CW ROTATION)
N124 G90 G0 X-5. Y10. Z5.
N125 M8(COOLANT ON)
N126 G83 Z-15. F500. (FIRST HOLE)(★)
N127 X0. (SECOND HOLE)
N128 X5. (THIRD HOLE)
N129 X10. (LAST HOLE, G83 MODE UP TO HERE)(★)
N130 G80(FIXED CYCLE CANCEL)
N131 M9 (COOLANT OFF) M5 (SPINDLE STOP: MAIN SHAFT STOP)
N132 G0 Z5.
N133 G91 G28 X0 Y0 Z0(★)
N134 (---TAPPING STEP----------------)
N135 T3 M6 (TOOL CHANGE: TOOL REPLACEMENT TO TOOL WITH TOOL NUMBER 3)(★)
N136 S1500 M3(SPINDLE CW ROTATION)
N137 G90 G0 X-5. Y10. Z5.
N138 M8(COOLANT ON)
N139 M49 (BYPASS OVERRIDE: IGNORE OVERRIDE)
N140 G84 Z-10. F0.75 S1500. (FIRST HOLE)(★)
N141 X0. (SECOND HOLE)(★)
N142 X5. (THIRD HOLE)(★)
N143 X10. (LAST HOLE, G84 MODE UP TO HERE)(★)
N144 G80(FIXED CYCLE CANCEL)
N145 M48 (CANCEL M49: CANCEL IGNORE OVERRIDE)
N146 G0Z5.
N147 M9 (COOLANT OFF: CUTTING FLUID OFF) M5 (SPINDLE STOP: MAIN SHAFT STOP)
N148 G91 G28 X0 Y0 Z0(★)
N149 (---TOOL LENGTH RE-MEASUREMENT----------------)
N150 M19(ORIENTED SPINDLE STOP)
N151 G90 G0 X10. Y0.
N152 G37 Z-30. F300. (TOOL LENGTH MEASUREMENT: TOOL LENGTH MEASUREMENT)(★)
N153 G91 G28 X0 Y0 Z0(★)
N154 M30 (END OF DATA: END OF PROGRAM)
```

FIG.5

MAIN PROGRAM

```
N201 O2 (WORK NO2)
N202 M10(UNCLAMP WORKPIECE)
N203 M60(WORKPIECE CHANGE) (★)
N204 M11(CLAMP WORKPIECE)
N205 M41 (GEAR SELECTION 1)
N206 G55 (WORKPIECE COORDINATE SYSTEM SELECTION 2)
N207 T4 M6 (TOOL CHANGE: TOOL REPLACEMENT TO TOOL WITH TOOL NUMBER 4)
N208 G43 H4 (TOOL OFFSET: TOOL LENGTH CORRECTION)
N209 (---WORKPIECE MEASUREMENT-------------)
N210 G91 G28 X0. Y0. Z0.
N211 G0 Z50. (★)
N212 G0 X0 Y0
N213 Z05.
N214 G31 Z-5. F10. (WORKPIECE POSITION MEASUREMENT)(★)
N215 G0 Z50. (OPPOSITE DIRECTION POSITIONING WITH RESPECT TO SAME
POSITION)(★)
N216 (---TOOL DIAMETER MEASUREMENT-------------)
N217 G0 X0. Y90. Z10.
N218 G4 X5. (DWELL: STOP 5 SECONDS)(★)
N219 M111 X-3. (TOOL DIAMETER MEASUREMENT)(★)
N220 G41 D4 (CUTTER COMPENSATION: TOOL DIAMETER CORRECTION)
N221 (---ROUGH MACHINING-------------)
N222 G64 (ACCELERATION AND DECELERATION AFTER INTERPOLATION)(★)
N225 G591 X0. Y0. Z-10. U50. V15. F1000. (POCKET ROUGH MACHINING)
N226 ···
N229 (---SIDE FACE FINISHING-------------)
N230 M42 (GEAR SELECTION 2)
N231 G61.1 (ACCELERATION AND DECELERATION BEFORE INTERPOLATION)(★)
N232 G17 (XY PLANE SELECTION)
N233 G02 I10. (CIRCULAR ARC)(★)
N234 ···
N235 G91 X10. Y-0.1 (DIRECTION REVERSAL OF Y SHAFT AT END POINT)(★)
N236 G91 X10. Y0.1 (DIRECTION REVERSAL OF Y SHAFT AT START POINT)(★)
N237 ···
N238 G91 G0
N239 X10. TPOS=0.01(ACCURACY DESIGNATION)(★)
N240 Y10.
N241 G02. I1. TCIRC=I0.03 (ACCURACY DESIGNATION)(★)
N242 ···
N243 G40 (CANCEL TOOL DIAMETER CORRECTION)
N244 (---SIDE FACE MACHINING-------------)
N245 G68 (THREE-DIMENSIONAL COORDINATE TRANSFORM ON)(★)
N246 ···
N247 G101 X-5. Y-5. Z-3.I5.J5.R2.P1. (ROUGH MACHINING)
N248 G102 X-5. Y-5. Z-3.I5.J5.R2. (FINISHING)(★)
N249 ···
N250 G69 (THREE-DIMENSIONAL COORDINATE TRANSFORM OFF)(★)
N251 M30 (END OF DATA: END OF PROGRAM)
```

SUB PROGRAM

```
N271 O591 (POCKET ROUGH)
N272 G0 X#24 Y#25
N273 G1 F#9
N274 Z#26 (FIRST★)
···
N276 X#24 Y#25
N277 ···
N278 X#21 (CORNER)(★)
N279 Y#22 (★)
N280 ···
N290 X#24 Y#25 (LAST)(★)
N291 G0 10.
N292 M99
```

FIG.6

| | |
|---|---|
| N301 O3 ($1: SYSTEM 1)<br>N302 T11 (TOOL REPLACEMENT TO TOOL WITH TOOL NUMBER 11)<br>N303 M101 (TURNING MODE: TURNING MODE)(★)<br>N304 G95 S1500 M3<br>N305 G0 Z0.<br>N306 G0 Z0.<br>N307 G1 X5. F0.1<br>N308 G0 Z10.<br>N309 G1 X10. Z0.<br>N310 G33 Z-10. F0.15(THREAD CUTTING)(★)<br>N311 G0X20.<br>N312 Z0. M5<br>N313 G4 X0.5<br>N314 !L1 (WAITING TIME) | N401 O4 ($2: SYSTEM 2)<br>N402 T21 (TOOL REPLACEMENT TO TOOL WITH TOOL NUMBER 21)<br>N403 M101 (★)<br>N404 G95 S1000 M3<br>N405 G0 Z10.<br>N406 G1 X17. F0.3<br>N407 X16. Z9.<br>N408 X14.5 Z8.5<br>N409 X14.4 Z8.4<br>N410 X14.2 Z8.2<br>N411 G0 X20.<br>N412<br>N413<br>N414 !L1 |
| N315 G126 Z2=Z1 (SUPERPOSITION OF CONTROL SHAFT)(★)<br>N316 !L2 (WAITING TIME) | N415<br>N416 !L2 |
| N317 G4 X1.<br>N318 G00 X46. Z2.<br>N319 G01 Z-50. F0.1 ;<br>N320 G4 X2.<br>N321 !L3 (WAITING TIME) | N417 G4 X0.5<br>N418 G0 X54.<br>N419 G1 X40. F0.1<br>N420 X39.5<br>N421 !L3 |
| N322 G126 Z2 (CANCEL SUPERPOSITION OF CONTROL SHAFT)(★)<br>N323 !L4 (WAITING TIME) | N422<br>N423 !L4 |
| N324 G4 X1.<br>N325 G00 X36. Z2.<br>N326 G01 Z-20. F0.1 ;<br>N327 M5<br>N328 !L5 (WAITING TIME) | N424 M5<br>N425<br>N426<br>N427<br>N428 !L5 |
| N329 G110 X1Z2C1 (CONTROL SHAFT REPLACEMENT)(★)<br>N330 !L6 (WAITING TIME) | N429 G110 X2Z1C2 (CONTROL SHAFT REPLACEMENT)(★)<br>N430 !L6 |
| N331 T12 (TOOL REPLACEMENT TO TOOL WITH TOOL NUMBER 12)<br>N332 M102(MILLING MODE) (★)<br>N333 S3000 M3<br>N334 G94(FEED PER MINUTE)<br>N335 G0 Z10. C90.<br>N336 G1 X10. F300.<br>N337 Z-1.<br>N338 X9.<br>N339 X11.<br>N340 G0 Z30. M5<br>N341 !L7 (WAITING TIME) | N431 T21 (TOOL REPLACEMENT TO TOOL WITH TOOL NUMBER 22)<br>N432 G0 Z10.<br>N433 S800 M3<br>N434 G1 X16. F0.3<br>N435 X13.5 Z8.5<br>N436 X13.4 Z8.4<br>N437 X13.2 Z8.2<br>N438 G0 X20.<br>N439 M5<br>N440<br>N441 !L7 (WAITING TIME) |
| N342 M30 (END OF DATA: END OF PROGRAM) | N442 M30 (END OF DATA: END OF PROGRAM) |

NUMERICAL CONTROL DEVICE

CROSS REFERENCE TO RELATED APPLICATIONS

This application is a National Stage of International Application No. PCT/JP2013/060647, filed Apr. 8, 2013, the contents of which are incorporated herein by reference in its entirety.

FIELD

The present invention relates to a numerical control device for preventing poor accuracy by monitoring a position of each shaft of a machine tool.

BACKGROUND

A machine tool is a device that machines a workpiece into a desired shape by moving a tool with respect to the workpiece. The motion accuracy of the machine tool directly relates to the accuracy of the workpiece. Therefore, so as not to machine large quantities of workpieces with poor accuracy and ship them to the market, the numerical control device has a function of monitoring positions of the respective shafts of the machine tool.

For example, in the conventional numerical control device described in Patent Literature 1 or 2, the operator designates a position monitoring point as a sequence number, a G code, or accompanying information in a machining program.

CITATION LIST

Patent Literatures

Patent Literature 1: Japanese Patent Application Laid-open No. 2004-102568
Patent Literature 2: Japanese Patent Application Laid-open No. 2005-011203

SUMMARY

Technical Problem

However, in the conventional numerical control devices described above, because the position monitoring point is designated by the operator, there is a problem in that setting thereof takes time and effort. Further, because the position monitoring point is designated by the operator, there is a problem in that the position monitoring point may not be monitored reliably due to an erroneous designation or an omission of the designation of the position monitoring point.

If any position monitoring point is not specifically designated and monitoring is performed at all times with respect to the whole operation in the machining program, there will be no error in the designation and time and effort are not required for the designation. However, in this case, there is a problem in that monitoring processing and the data amount for monitoring increase, thereby increasing the processing load of the computer and memory capacity thereof to be used. Further, if the monitoring point is designated by a G code or the like in the machining program, there are problems in that the machining program is erroneously corrected and thus the machining is affected and a cycle time becomes longer due to the processing of the added G code.

The present invention has been achieved to solve the above problems, and an object of the present invention is to provide a numerical control device that can automatically monitor whether a position of a required portion is correct and whether a positional error is not excessive without requiring the operator to perform a setting, by automatically determining a position monitoring point without correcting the machining program.

Another object of the present invention is to provide a numerical control device that can automatically determine not only a position monitoring point but also the type of data to be monitored at each position monitoring point.

Another object of the present invention is that, while automatically determining a monitoring point, it enables an operator to change an automatically determined position monitoring point and the type of data to be monitored at each position monitoring point so that adjustment can be performed such that the processing time and the required memory amount of a computer can be further reduced or more pieces of data can be monitored.

Still another object of the present invention is to provide a numerical control device that can easily collect, analyze, and display information in order to determine whether the cause of accuracy deterioration is on the machine side or on the control side.

Solution to Problem

In order to solve the above problems and achieve the object, an aspect of the present invention is a numerical control device including: a control unit that controls a movement of a plurality of shafts of a machine tool by a position command according to a machining program and acquires position information on the shafts; a monitoring point determination unit that determines a monitoring point, which is to be monitored, in the machining program and a monitoring shaft that is the shaft to be monitored, in accordance with a type of an instruction or an instruction related to a travel described in the machining program; and a monitoring unit that monitors whether an error or a deviation based on the position information at the monitoring point of the monitoring shaft exceeds a predetermined threshold, wherein the control unit controls a movement of the shafts on a basis of a monitoring result of the monitoring unit, and the numerical control device further comprises an analysis unit that presents whether a cause of the error or the deviation is a mechanical factor or a control factor on a basis of the monitoring result and that outputs an analysis result of the factor to an output unit.

Advantageous Effects of Invention

The numerical control device according to the present invention can automatically extract a position monitoring point without any correction of the machining program and thus can monitor a position easily without requiring time and effort. Further, because the position monitoring point is not manually designated, an erroneous designation or an omission of the designation can be prevented. Therefore, an effect is obtained where the occurrence of defective workpieces can be prevented.

BRIEF DESCRIPTION OF DRAWINGS

FIG. 3 is a table illustrating an example of determination parameters according to the embodiment.

FIG. 4 is a diagram illustrating a first example of a machining program according to the embodiment.

FIG. 5 is a diagram illustrating a second example of the machining program according to the embodiment.

FIG. 6 is a diagram illustrating a third example of the machining program according to the embodiment.

DESCRIPTION OF EMBODIMENTS

Exemplary embodiments of a numerical control device according to the present invention will be explained below in detail with reference to the accompanying drawings. The present invention is not limited to the embodiments.

Embodiment

Figure 1:
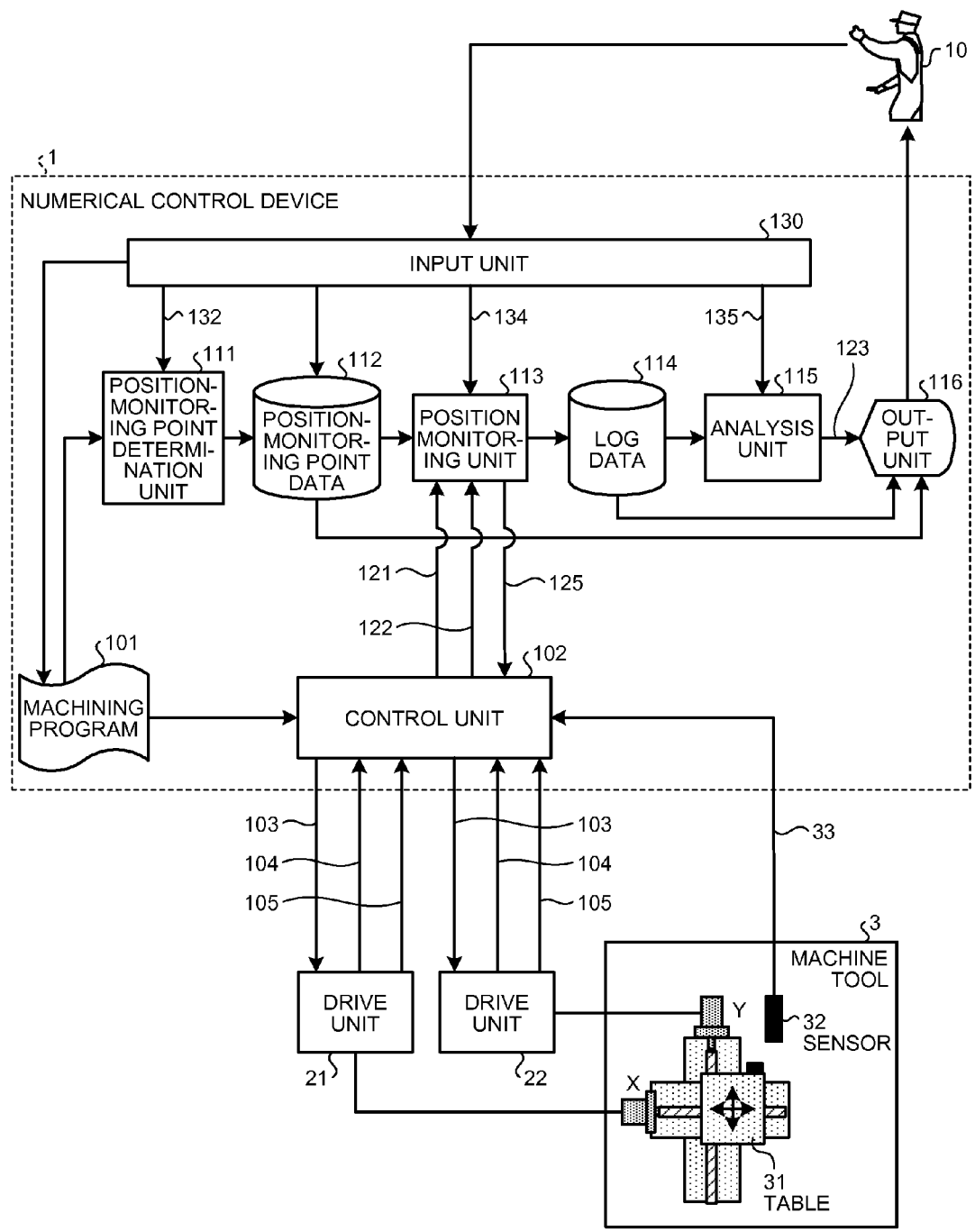
FIG. 1 is a configuration diagram illustrating a configuration of a numerical control device according to an embodiment of the present invention.

FIG. 1 is a configuration diagram illustrating a configuration of a numerical control device 1 according to an embodiment of the present invention. In FIG. 1, the numerical control device 1 controls drive units 21 and 22 (a servo amplifier and a main shaft amplifier) of respective shafts of a machine tool 3. The numerical control device 1 is realized by, for example, an electronic computer including a buffer (storage unit) and having an output device connected thereto, such as a personal computer.

The machine tool 3 includes linear shafts of an X shaft, a Y shaft, and a Z shaft, and a main shaft that rotates a workpiece (an object to be machined, not shown) or a tool (not shown) in order to cause a relative motion of the tool with respect to the workpiece attached to a table 31 (or a chuck). However, in FIG. 1, only the X shaft and the Y shaft are illustrated because of space limitations of the drawing. The shafts each include a drive motor, and driving of the motors is controlled by the drive units 21 and 22.

The numerical control device 1 includes a control unit 102, a position-monitoring point determination unit 111, a position monitoring unit 113, an analysis unit 115, an output unit 116, and an input unit 130. The control unit 102 issues a position command 103 to the drive units 21 and 22 in order to perform a desired motion according to a machining program 101, and acquires a position feedback 104 (a position detection value) and a load feedback 105 (a load detection value) from the drive units 21 and 22. The control unit 102 also acquires a sensor signal 33 from a sensor 32 installed in the machine tool 3. When the sensor 32 is a sensor that measures the machine position of each shaft, the sensor signal 33 indicates the machine position of each shaft.

The position feedback 104 is measured by a position detector (an encoder or the like) installed in the motor. The load feedback 105 is obtained by measuring a load applied to the motor by a load detector installed in the motor, and the load referred to herein specifically indicates "current", "voltage", "torque", or "power". The sensor 32 is a sensor that is installed at a predetermined position in the machine tool 3 and that measures the position of the machine or determines that the machine is at a specific position. For example, the sensor 32 is a linear scale, a proximity sensor, a dog switch, or a touch sensor. The sensor signal 33 is a signal that is transmitted from the sensor 32 to the control unit 102 and is a signal indicating a detection value of the machine position or indicating that the machine is at a specific position (for example, if the machine is at a specific position, the signal indicates "ON", and if it is not, the signal indicates "OFF").

Position data 121 (position information) of each shaft is transmitted from the control unit 102 to the position monitoring unit 113. In this example, the position data 121 includes the position command 103 and the position feedback 104, and also includes the sensor signal 33 in the case of the machine provided with the sensor 32. At this time, it is possible to transmit data calculated on the basis of any of the position feedback 104, the position command 103, and the sensor signal 33 or a combination of these elements.

In this example, the calculated data includes a position deviation (i.e., the difference between the position command 103 and the position feedback 104), a synchronization error (i.e., a synchronization error of positions of the position feedbacks 104 of a plurality of shafts that operate synchronously), the difference (mechanical error) between the motor position (the position feedback 104) and the machine position (the sensor signal 33 when the sensor 32 that measures the machine position is used), and the like. For example, because the synchronization error can be calculated on the basis of the difference between the position feedbacks 104 of a plurality of shafts, the synchronization error can be obtained by calculation performed by the position monitoring unit 113. However, if the data is monitored by the position monitoring unit 113, a transmission data amount from the control unit 102 to the position monitoring unit 113 can be reduced by transmitting only the synchronization error calculated beforehand by the control unit 102, thereby enabling the processing load associated with communication to be reduced. By using both the machine position and the motor position as the position data 121 (position information), that is, by monitoring both the machine position and the monitoring position at a position where the position of the machine can be detected, if a positional error occurs, it is possible to determine whether there is a problem on the machine side or on the control side including the motor; therefore, the problem can be solved easily.

Furthermore, by transmitting load data 122 of each shaft from the control unit 102 to the position monitoring unit 113, the position data 121 and the load data 122 can be recorded in a combined manner and can be used for analysis or screen display of an error factor. It is assumed that the load data 122 is a value of the load feedback 105 acquired by the drive units 21 and 22 or a value of a converted load calculated on the basis of the load feedback 105 (for example, the load feedback 105 is a motor current value and the load data 122 is a torque obtained by multiplying it by a torque constant). The load data 122 is also transmitted along with the data to be monitored by the position monitoring unit 113.

The position-monitoring point determination unit 111 automatically determines a position monitoring point from the machining program 101 and outputs the determined position monitoring point as position-monitoring point data 112. The point referred to herein can be also a position or timing (a time or an elapsed time). The position-monitoring point determination unit 111 determines a travel monitoring point matching the condition on the basis of the type of an instruction (a G code, an M code, or the like) given in the machining program 101 and a feature amount relevant to the travel. The feature amount relevant to the travel is a feature amount regarding a travel channel or temporal variation of position and speed in in the travel. Specifically, it is assumed that the feature amount includes a travel distance, a travel direction, a curvature radius or a curvature, a change of travel direction, a travel speed, a change of travel speed, a travel time, an acceleration and deceleration time, a stop time, and the like. It is assumed that the type of the instruction as a condition of the position monitoring point and the feature amount relevant to travel as the condition of the position monitoring point (a threshold (a reference value) or a range of each feature amount) can be input from the input unit 130 to the position-monitoring point determination unit 111 as a determination parameter 132. By determining the travel monitoring position in this manner, monitoring can be performed by restricting monitoring to the point requiring monitoring among the travel operations. Therefore, an effect is obtained where the processing load required for monitoring can be reduced and the data size can be reduced in the case of storing the data. A specific procedure for determining the position monitoring point from the machining program 101 by the position-monitoring point determination unit 111 on the basis of the determination parameter 132 is described later in detail with reference to FIGS. 2 and 3.

The position monitoring unit 113 acquires the position data, the sensor data, and the load data at a point where the position is monitored according to the position-monitoring point data 112, thereby performing position monitoring. Specifically, the position monitoring unit 113 performs position monitoring described below:

whether the position feedback 104 is deviated from the reference position;

whether the position command 103 is deviated from a predetermined target position given in the machining program 101;

whether the position deviation is large;

whether the synchronization error is large;

whether the trajectory error (an error between a commanded shape and a trajectory of the position feedback 104) is large; and whether an error between the machine position and the motor position is large.

In the above types of monitoring, the threshold (a reference value) used for determining whether the error or deviation is large is input from the input unit 130 to the position monitoring unit 113 as a monitoring parameter 134. In this case, an operator 10 does not give a command regarding the position monitoring point in the machining program 101, but the position-monitoring point determination unit 111 automatically performs monitoring as described above at the automatically determined position monitoring point, thereby enabling position monitoring to be performed without requiring time and effort to create a machining program by the operator 10.

If the position monitoring point is determined continuously over a plurality of travels of the same type, the position monitoring unit 113 can perform position monitoring only in the first travel, the last travel, or both the travels without monitoring all the position monitoring points according to the position-monitoring point data 112. By performing monitoring effectively with fewer monitoring points, reduction of the processing load due to monitoring and reduction of the data size in the case of storing the monitoring data can be realized.

A position monitoring result 125, which is the result of the position monitoring described above by the position monitoring unit 113, is transferred to the control unit 102 from the position monitoring unit 113. The control unit 102 executes various types of control, such as to reduce the operation speed, to stop the operation temporarily, and to stop the operation of the machining program 101, according to the position monitoring result 125 from the position monitoring unit 113.

The position monitoring result 125 is stored in a buffer (storage unit) of the numerical control device 1 as log data 114. In this case, the log data 114 always includes the position data 121, and more preferably, the load data 122 and the position monitoring result 125 are also stored as the log data 114. For example, a movement before and after the occurrence of an error can be analyzed by recording the position data 121 as the log data 114. Further, by also recording the load data 122 as the log data 114, the occurrence position of an error and the state before and after the occurrence of the error can be analyzed in detail. According to the analysis thereof, it is possible to take measures for preventing defective workpieces from being shipped to the market.

The analysis unit 115 analyzes the error factor that causes a positional error of the machine on the basis of the stored log data 114. In this case, as an analyzing method, the analysis unit 115 determines whether there is a difference between the machine position and the position feedback 104 (motor position) or there is a difference between the position feedback 104 (motor position) and the position command 103 (or the program command position). If there is a difference between the machine position and the position feedback 104, the analysis unit 115 determines that the error factor is a mechanical factor, and if there is a difference between the position feedback 104 and the position command 103, the analysis unit 115 determines that the error factor is a control factor. The analysis unit 115 then presents the determination result to the operator 10 through the output unit 116.

In addition, if the error factor that causes a positional error of the machine is a mechanical factor, the analysis unit 115 analyzes the correlation between the error between the machine position and the position feedback 104 and the travel direction, and calculates backlash (slip) on the basis of the difference between the error when traveling in a positive (+) direction and the error when traveling in a negative (−) direction. If there is a trajectory error component that occurs locally at a point where the travel direction is reversed, the analysis unit 115 determines it as a stick motion due to coulomb friction and calculates a friction torque (or a friction force) on the basis of the motor torque (or the motor thrust) immediately before and after the direction reversal. Machine vibration is another mechanical error factor. Regarding the machine vibration, the vibration period and the damping ratio are calculated by reading, for example, a speed peak value and the time thereof, from a free vibration waveform at a point to stop traveling after a certain travel.

Furthermore, if the error factor that causes a positional error of the machine is a control factor, the analysis unit 115 analyzes whether an error has occurred between the program command position given in the machining program 101 and the position command 103 to be transmitted to the drive units 21 and 22 or an error has occurred between the position command 103 and the position feedback 104 (motor position). If the error has occurred between the program command position and the position command 103, the analysis unit 115 corrects the machining program 101, and for example, adds an instruction of an accuracy command to the machining program 101, inserts a dwell (stop) between travels, or changes an acceleration and deceleration method, thereby improving the accuracy of the position command 103. If the error has occurred between the position command 103 and the position feedback 104, a control gain of the drive units 21 and 22, a friction correction amount, or the like is adjusted to improve the accuracy.

It is assumed that the reference value when the above analysis is performed (for example, a time or a distance to analyze before and after direction reversal or a threshold for determining the presence or absence of an error) can be input from the input unit 130 to the analysis unit 115 as an analysis parameter 135.

It is effective to further include the output unit 116 that outputs the analysis result to an output device such as a screen, a printer, or a communication unit to output (to display, to print, to communicate, or the like) the analysis result, thereby presenting the analysis result to the operator 10. In this case, the operator 10 can easily check the status when a positional error has occurred by outputting the position-monitoring point data 112 and the log data 114 along with the analysis result. In this manner, because the analysis unit 115 automatically analyzes the error factor, even the operator 10 who does not know how to analyze the error factor can easily check the error factor. Accordingly, it becomes easy to take correct measures and thus it becomes possible to prevent defective workpieces from being shipped to the market.

The operator 10 edits (corrects) the machining program 101 through the input unit 130 to solve the positional error on the basis of the position-monitoring point data 112, the position monitoring result 125, the log data 114, and an analysis result 123 output from the output unit 116. Alternatively, the operator 10 edits (corrects) the position-monitoring point data 112 through the input unit 130 in order to review position monitoring (for detailed monitoring, changing the monitoring condition, simplifying monitoring, or the like). Accordingly, it becomes possible to change the position-monitoring point data 112 to more appropriate data on the basis of the experience and know-how of the operator 10 as well as automatically determining the position-monitoring point data 112, thereby enabling more correct and effective monitoring to be performed.

Figure 2:
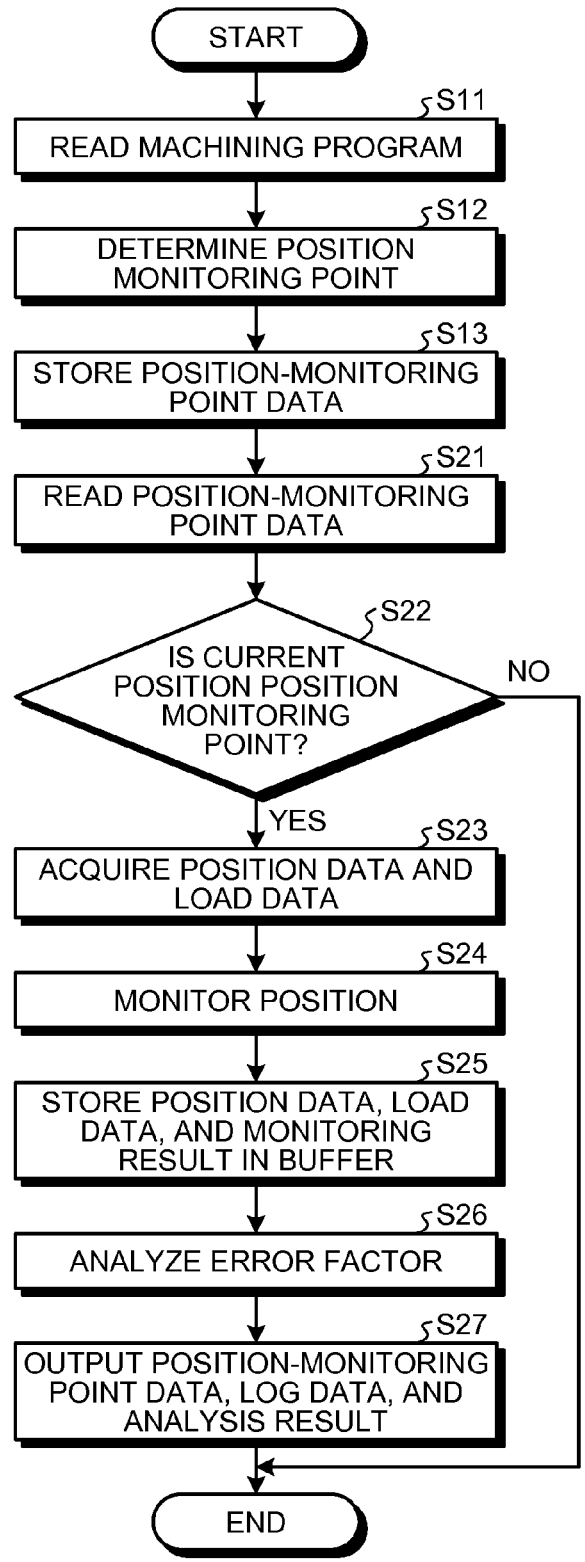
FIG. 2 is a flowchart illustrating a processing flow in the numerical control device according to the embodiment.

FIG. 2 is a flowchart illustrating a processing flow in the numerical control device 1. In FIG. 2, at Step S11, the position-monitoring point determination unit 111 reads the machining program 101. At Step S12, the position-monitoring point determination unit 111 refers to the determination parameter 132 to determine a position monitoring point. At Step S13, the position monitoring point determined at Step S12 is stored in a buffer (storage unit) of the numerical control device 1 as the position-monitoring point data 112. Processes from Step S11 to Step S13 can be performed before the operation or can be performed before the position to be controlled by the control unit 102 reaches the position monitoring point determined by the position-monitoring point determination unit 111, by reading ahead of the machining program 101 during the operation.

At Step S21, the position monitoring unit 113 reads the position-monitoring point data 112 that has been stored at Step S13. At Step S22, the position monitoring unit 113 determines whether the current position is the position monitoring point. The position monitoring unit 113 acquires the position data 121 including information on the current position where the control is currently executed (such as an O/N/B number, the position of each shaft, and the remaining distance to the end point of a block) from the control unit 102, and determines whether the current position matches the point registered in the position-monitoring point data 112.

When the current position is the position monitoring point (YES at Step S22), the process proceeds to Step S23, where the position monitoring unit 113 acquires the position data 121 and the load data 122 from the control unit 102. Subsequently, at Step S24, the position monitoring unit 113 monitors the position on the basis of the position data 121 and the monitoring parameter 134. The position monitoring unit 113 monitors whether the deviation or the error calculated on the basis of the position data 121 exceeds the threshold provided as the monitoring parameter 134, and notifies the control unit 102 of the position monitoring result 125 as the monitoring result. Then, the control unit 102 executes stop control and the like. Thereafter, at Step S25, the position data 121, the load data 122, and the position monitoring result 125 are stored in the buffer (storage unit) of the numerical control device 1 as the log data 114. The log data 114 is held as time-series data. At Step S26, the analysis unit 115 analyzes the error factor on the basis of the log data 114 and the analysis parameter 135 to acquire the analysis result 123. At Step S27, the position-monitoring point data 112, the log data 114, and the analysis result 123 are output to the output device such as a screen, to present the data to the operator 10. At steps of at least from Step S22 to Step S25, the processes are performed in real time in association with the position control of the machine tool 3 by the control unit 102. Typically, the processes from Steps S22 to S25 are performed every predetermined control cycle. Step S21 can be performed prior to the operation, or the machining program 101 can be read ahead sequentially during the operation. Steps S26 and S27 can be performed collectively after the operation, or the analysis or output up to a certain time point can be sequentially performed during the operation.

Meanwhile, when the current position does not correspond to the position monitoring point (NO at Step S22), the subsequent processes from Step S23 are not performed. Thus, the processing load other than that at the position monitoring point can be reduced; therefore, the size of the log data 114 can be reduced.

FIG. 3 is a table illustrating an example of the determination parameters 132. In FIG. 3, determination references (determination rules) of position monitoring points from numbers 1 to 24 are registered, and marked numbers in the selection columns express currently effective determination references. In the table of FIG. 3, "command type" is a command given in the machining program 101 (a G code, an M code, other codes, and a feature of travel), and specifically, a point matching the "determination method of command type" is assumed to be the position monitoring point. While the point referred to herein indicates an execution position in the machining program 101 (a block, or a start point and an end point of the block, or a middle point thereof), the point can be designated by a position travel timing (a clock time or an elapsed time). The section of "details of monitoring point" in the table of FIG. 3 is to designate (or to restrict) the monitoring point (a monitoring position or a monitoring timing) more specifically at the point matching the "command type" described above. The value described as "predetermined" therein can be an initial parameter or a parameter that can be changed by the operator 10. "Shaft to be monitored" in the table of FIG. 3 indicates a target shaft to be monitored at each position monitoring point. The target shaft is restricted to requisite minimum to aim to achieve a reduction of the processing amount and memory usage. The target shaft can be also changed by the operator 10. "Log data to be recorded" in the table of FIG. 3 indicates data to be stored at each position monitoring point, and basically, the position data 121 (or an error or a deviation of the position) is stored. However, according to the circumstances, the load data 122 such as a motor current is also stored, thereby facilitating later analysis of the error factor. The log data 114 to be recorded can be also changed by the operator 10.

In the zero return operation in number 1, a dog switch that detects whether the machine position is at the origin position is provided. When the dog switch is turned on, it is possible to determine that the machine position is at the origin position. By monitoring the difference between the machine position (=the machine origin) and the motor position at a timing when the switch is turned on, it is possible to monitor poor accuracy due to a mechanical error such as thermal displacement.

Numbers 2 and 3 are for measuring tools and workpieces. When the sizes of tools and workpieces are roughly known and there is no large variation in these sizes, occurrence of poor accuracy can be monitored by monitoring a deviation from the reference value of the position feedback 104 (for example, the value of the position feedback 104 when the size of a tool or a workpiece is set as a reference value) measured by bringing the tool or the workpiece into contact with the sensor 32.

Tool replacement and workpiece replacement in numbers 4 and 5 indicate points where poor accuracy is likely to occur due to a change of stability of the control system or a change of responsiveness with respect to a command as a result of the change of inertia (moment of inertia) or mass. The position is monitored at this point, the current is stored, and the change of the inertia or mass is analyzed. In addition, generally, in an operation having a large change in any of the inertia (moment of inertia), the mass, and the speed reduction ratio of the machine tool 3, it is preferable to perform monitoring in a similar manner. Specifically, any of (1) immediately after replacement of a workpiece, a tool, or a jig, (2) a point where servo control has been started after replacement of a workpiece, a tool, or a jig, and (3) a first travel after replacement of a workpiece, a tool, or a jig, or a combination of these elements is set as a position monitoring point. That is, it is possible to automatically determine a point where the responsiveness or stability changes obviously due to a change of any of the mass, the moment of inertia, and the speed reduction ratio of the machine tool 3 and thus the accuracy is affected and to monitor the point easily and effectively without requiring time and effort.

Opposite direction positioning (fast-forward) point with respect to the same position in number 6 is a point where poor accuracy is likely to occur, due to the impact of the lost motion (slip, backlash) of the machine. This point is the end point or the start point of a pair of positioning travels that cause at least one of the shafts to travel in directions opposite to each other, and by automatically extracting this point, occurrence of poor accuracy can be prevented. That is, it is possible to automatically determine and monitor a point likely to be affected by backlash of the machine. Accordingly, the impact of the backlash can be monitored easily without requiring time and effort. In this case, by also storing the motor current, analysis of the lost motion is facilitated on the basis of the relation between the position and current.

Numbers 7 and 8 indicate points where the accuracy is affected because of the impact of a change in disturbance as a result of a large change of coulomb friction due to the speed reversal (generating a so-called "quadrant projection"). By automatically extracting this point, occurrence of poor accuracy is prevented. By automatically determining a point likely to be affected by friction that is the disturbance, monitoring can be performed easily without requiring time and effort. At a direction reversal point, the sign of the speed command (a differential value of the position command 103) is also reversed, and thus there is an impact on the accuracy due to a change of the speed command. Therefore, in order to suppress this impact and accurately capture the impact due to the disturbance, it is preferable to select a point where a change of the command value is relatively small. That is, it suffices to select a point where the position command 103 of each shaft, the speed command of each shaft, and an acceleration command of each shaft are small or a point where a change of a feed speed command along a command channel is small in a tangent-continuous shape such as a circular arc or in a shallow corner shape. More specifically, it is desirable that the position monitoring point is a point where the command channel is tangent-continuous or a direction change of the tangent is small, where the feed speed command is constant, and where the sign of speed of at least one shaft is reversed. That is, by setting a point where it is assumed that the speed command or the acceleration command is small as the position monitoring point, the impact of a tracking error due to the change of the speed command or acceleration is eliminated and thus the impact of the disturbance can be ascertained more accurately; therefore, monitoring can be performed more accurately. In this case, by also storing a motor current, analysis of friction characteristics can be facilitated on the basis of the relation between the position and current.

Numbers 9 and 10 indicate points where the shaft stops (dwells) for a predetermined time after a positioning travel or a cutting feed travel and points where the impact of vibrations excited when decelerating toward the end of travel and being stopped thereafter appears noticeably on the machined surface. By automatically extracting the point, occurrence of poor quality of the machining surface is particularly prevented. A predetermined time before and after the end of travel is recorded so that characteristics such as a vibration period can be analyzed. That is, because a point likely to be affected by vibrations can be automatically determined and monitored, the impact of vibrations can be easily monitored without requiring time and effort.

Numbers 11 to 14 indicate points where the control mode of the control unit 102 in the numerical control device 1 is changed and points where a defect such as accuracy variation is likely to occur according to how the machining program 101 is created, and particularly, in the case of multiple systems, according to the operation timing between the systems. By automatically extracting the point, occurrence of poor accuracy is prevented. The control mode to be particularly monitored includes a control mode related to position conversion, a control mode related to speed conversion, and switching between the position control and the speed control. The control mode related to position conversion among them is further divided into coordinate transform and synchronous control. By automatically determining a point where there is a high risk of occurrence of a positional error due to a change of the control mode, monitoring can be easily performed without requiring time and effort.

Number 11 indicates a point where a coordinate transform mode is changed, and for example, the coordinate transform includes the following ones:

coordinate transform between coordinate systems such as an orthogonal coordinate system, a polar coordinate system, a cylindrical coordinate system, and a sloping coordinate system;

zooming (scaling), reflection (mirror image), coordinate rotation;

three-dimensional coordinate transform; and coordinate transform between a tool end and a motor position in a five-axis machine tool or a robot arm.

Number 12 indicates a point where a synchronous control mode is changed, and synchronous control includes, for example, the following ones:

synchronous tapping (a tool main shaft and a feed shaft are synchronized with each other);

threading machining (a turning main shaft and a feed shaft are synchronized with each other);

tandem control (move one movable part (a table or the like) by a dual-axis motor);

main shaft synchronous control (hold and move one workpiece by two main shafts); and superposition control (move a superposed shaft with respect to a moving reference shaft at a designated relative speed).

Number 13 indicates a point where a control mode related to a change of an acceleration and deceleration method is changed, and the acceleration and deceleration method includes the following ones:

acceleration and deceleration before interpolation, acceleration and deceleration after interpolation; and linear acceleration and deceleration, multistage acceleration and deceleration, S-shaped acceleration and deceleration, first-order lag acceleration and deceleration, and second-order lag acceleration and deceleration, and the acceleration and deceleration method can include a change of the acceleration/deceleration time constant.

Number 14 indicates a point where a position control mode and a speed control mode are switched therebetween. For example, in the lathe, because the main shaft is rotated at a constant speed during turning, speed control is generally used. Meanwhile, when the main shaft is position-controlled as a main-shaft C shaft to control the main shaft as a rotation shaft for turning the workpiece, position control is used. In addition, position control is executed when main shaft orientation is performed and when main-shaft synchronous control is executed. The position is monitored when switching between the speed control and the position control.

Furthermore, when a shaft to be controlled in the system is changed in number 15 (replacement of shaft, removal of shaft), a defect such as accuracy variation is likely to occur at this point, according to how the machining program 101 is created and, particularly in the case of multiple systems, according to the operation timing between the systems. By automatically extracting the point, occurrence of poor accuracy is prevented. Specifically, a point immediately after the configuration of the shaft to be controlled is changed or a first travel after the change is designated as the position monitoring point. By automatically determining a point where there is a high risk of occurrence of a positional error, such as a point where the configuration of the shaft to be controlled is changed, as the position monitoring point, monitoring can be easily performed without requiring time and effort.

Numbers 16 to 23 relate to a machining cycle (a fixed cycle or the like).

As for a machining cycle to be used for finishing in number 16, accuracy is important; therefore, monitoring is performed during cutting (a cutting feed block) of the finishing. That is, a machining cycle for finishing, a point where accuracy is designated, or a machining cycle for finishing and a point where accuracy is designated is designated as the position monitoring point. This is for effectively performing monitoring by restricting the position monitoring point to a point where accuracy is particularly required in machining.

A hole bottom portion in hole drilling (drilling or the like) in number 17 and a corner portion in pocket machining in number 18 are points where a load (a cutting resistance) becomes high, and poor accuracy due to the high load is likely to occur. By automatically extracting this point, occurrence of poor accuracy is prevented. The load or a change of the load can be determined by a method in accordance with a travel amount and a direction change thereof during the machining cycle or can be determined on the basis of the machining conditions (a cutting amount, a feed amount, and an engagement angle) in each block. In this case, by also storing a motor current, an increase tendency of the cutting resistance can be checked, thereby facilitating adjustment of the machining conditions. In addition to the hole bottom portion, the end of a groove is also a point where the cutting resistance becomes high; therefore, it is preferable to perform position monitoring at this point in a similar manner. By automatically determining a point likely to be affected by the cutting resistance, which is the disturbance, monitoring can be easily performed without requiring time and effort.

Number 19 indicates a point where the machining state changes transitionally due to a change of the cutting resistance and the machining position and the shape accuracy when machining is completed are largely affected generally when machining is started (when drilling is started, or the like) and when machining ends (when drilling ends, or the like) during a machining cycle. Therefore, a machining defect is likely to occur at this point. By automatically extracting this point, occurrence of poor accuracy is prevented. By automatically determining a point where the cutting resistance is large or a change of the cutting resistance is large, including the case of numbers 17 and 18, monitoring can be easily performed without requiring time and effort.

In this manner, in the case of numbers 17, 18, and 19, any of (1) the first cutting feed travel, (2) the last cutting feed travel, (3) the entrance of a hole, the hole bottom, the exit of a hole, (4) the end of a groove, and (5) a corner portion of a pocket in a machining cycle or a combination thereof is designated as the position monitoring point, while determining that the cutting resistance is large or a change of the cutting resistance is large. Further, in the case of numbers 17, 18, and 19, by designating a point where it is assumed that the speed command or the acceleration command is small as the position monitoring point, the impact of a tracking error due to a change of the commanded speed or acceleration is eliminated and thus the impact of the disturbance can be ascertained more accurately; therefore, monitoring can be performed more accurately.

Tapping and threading in numbers 20 and 21 indicate a point where machining is performed while performing the synchronous control and poor accuracy is likely to occur because of deterioration of a synchronization error. A synchronization error between a main shaft and a command shaft to be synchronized with each other is automatically monitored.

Number 22 indicates a case having a plurality of the same machining cycles (a plurality of holes having the same size, or the like). Generally, there is a tendency that forgetting to machine a workpiece in the previous step is likely to occur in the first or last machining cycle rather than that in the middle machining cycle. Particularly, as a general tendency, a machining programming error and machining omission of the previous step happen more frequently in the first or last stage of a series of machining rather than in the middle of machining. Further, in many cases, an impact of a defective machining condition and tool damage can be monitored sufficiently by monitoring the first or the last machining cycle, without monitoring all the machining cycles. For these reasons, by automatically monitoring only the first and last machining cycles, occurrence of poor accuracy is prevented efficiently while suppressing the processing load and memory usage. That is, by performing monitoring effectively at fewer monitoring points, the processing load due to monitoring can be reduced and the data size in the case of storing the monitoring data can be reduced.

In numbers 23 and 24, when required accuracy (a tolerance) is designated in the machining program 101, occurrence of poor accuracy is prevented by automatically extracting the corresponding point.

In addition to these features, a travel instruction to stop a travel if the sensor signal 33 output from the sensor 32 installed in the machine tool 3 during the travel or the motor load becomes a predetermined value or falls within a predetermined range can be designated as the position monitoring point. It is possible to automatically determine and monitor a point where there is a high risk of occurrence of position variation and positioning to an erroneous position because the travel position depends on the sensor signal 33 or the load without traveling to a position given in the machining program 101; therefore, monitoring can be performed easily without requiring time and effort.

A position monitoring point is registered as the position-monitoring point data 112 by the position-monitoring point determination unit 111 according to these determination parameters 132. The position-monitoring point data 112 has the following content:

(1) A number specifying a block in the machining program 101

A program number (O number), a sequence number (N number), and a block number (B number)

(2) Information regarding where the position monitoring point is in a block (a start point, an end point, or the whole block)

(3) In the case of the start point or the end point in (2), a distance or a time range therefrom (4) A shaft to be subjected to position monitoring (5) The type of log data 114 to be recorded (in a case of being recorded)

The monitoring point and data associated with monitoring are clearly defined by these pieces of the position-monitoring point data 112. By enabling the position-monitoring point data 112 itself to be edited by the input unit 130, a direct designation of the position monitoring point becomes possible, thereby enabling the position monitoring point to be designated more flexibly.

FIG. 4 is a diagram illustrating a first example of the machining program 101 according to the present embodiment. In the case of the first example of the machining program 101 illustrated in FIG. 4, the following position monitoring points are extracted on the basis of the respective determination criteria. It is assumed that determination criteria in the numbers 1, 2, 4, 5, 8, 14, 15, 20, and 22 in FIG. 3 are selected. In this case, the following position monitoring points are extracted on the basis of the respective determination criteria.

Determination criteria: position monitoring points/details of monitoring points/shaft to be monitored 1: N104/monitor position immediately after zero return/Z shaft 1: N105/monitor position immediately after zero return/X shaft, Y shaft 1: N119/monitor position immediately after zero return/X shaft, Y shaft, Z shaft 1: N133/monitor position immediately after zero return/X shaft, Y shaft, Z shaft 1: N148/monitor position immediately after zero return/X shaft, Y shaft, Z shaft 1: N153/monitor position immediately after zero return/X shaft, Y shaft, Z shaft 2: N152/predetermined time after sensor of tool length indicator is turned ON/Z shaft 4: N106/monitor position immediately after tool replacement (N106) and immediately after start of first travel (N108) after tool replacement/main shaft 4: N121/monitor position immediately after tool replacement (N121) and immediately after start of first travel (N123) after tool replacement/main shaft 4: N135/monitor position immediately after tool replacement (N135) and immediately after start of first travel (N136) after tool replacement/main shaft 5: Not applicable 8: Not applicable 14: Not applicable 15: Not applicable 20: N140 to N143/whole machining cycle/Z shaft, main shaft 22: N126, N129, N140, N143/whole block/all shafts (Points denoted by black start in FIG. 4 are the position monitoring points described above.)

"N140" and "N143" are redundantly selected from two determination criteria of "20" and "22". In this case, it suffices to perform monitoring by taking the sum of these or to implement priorities in the determination criteria and then perform monitoring according to the prioritized determination criterion.

FIG. 5 is a diagram illustrating a second example of the machining program 101 according to the present embodiment. It is assumed that the determination criteria in the numbers 2, 3, 5, 6, 7, 8, 9, 11, 13, 16, 18, 19, 23, and 24 in FIG. 3 are selected. In this case, the following position monitoring points are extracted on the basis of the respective determination criteria.

Determination criteria: position monitoring points/details of monitoring points/shaft to be monitored 2: N219/predetermined time before and after sensor of tool measuring instrument is turned ON/X shaft 3: N214/predetermined time before and after touch probe is turned ON/Z shaft 5: N203/immediately after replacement (N203), immediately after start of first travel (N210) after replacement/all shafts that drive workpiece 6: N211, N215/predetermined distance range from relevant position (Z50.)/Z shaft 7: N235 to N236/predetermined time near direction reversal/Y shaft 8: N233/predetermined time near direction reversal/X shaft, Y shaft 8: N241/predetermined time near direction reversal/X shaft, Y shaft 9: N218/predetermined time before and after end point of N217 (start point of N218)/X shaft, Y shaft, Z shaft 11: N245/immediately after coordinate system change (N245) or immediately after start of first travel (*1) after coordinate change/X shaft, Y shaft, Z shaft 11: N250/immediately after coordinate system change (N250)/X shaft, Y shaft, Z shaft 13: N222/immediately after change of acceleration and deceleration method (N222) or immediately after start of first travel (N272) after change/X shaft, Y shaft, Z shaft 13: N231/immediately after change of acceleration and deceleration method (N231) or immediately after start of first travel (N233) after change/X shaft, Y shaft, Z shaft 16: N248/cutting feed block in machining cycle/X shaft, Y shaft, Z shaft 18: N278 to N279/near end point of N278/all shafts 19: N274, N290/first and last cutting feed block/all shafts 23: N239/predetermined distance before and after end point of N239/X shaft, Y shaft 24: N241/whole block/X shaft, Y shaft (*1) First travel during machining cycle of G101

(Points denoted by black start in FIG. 5 are the position monitoring points described above.)

FIG. 6 is a diagram illustrating a third example of the machining program 101 according to the present embodiment. The left side of FIG. 6 indicates a machining program of a system 1 and the right side indicates a machining program of a system 2, these are operated in parallel, and machining is performed such that the timings of both systems match each other, by issuing a waiting time between the systems by means of a "!L" command at some points in the machining program. It is assumed that the determination criteria in the numbers 12, 14, 15, and 21 in FIG. 3 are selected. In this case, the following position monitoring points are extracted on the basis of the respective determination criteria.

Determination criteria: position monitoring points/details of monitoring points/shaft to be monitored 12: N315/immediately after change (N315) or immediately after start of first travel (N318) after change/Z1 shaft, Z2 shaft 12: N322/immediately after change (N322) or immediately after start of first travel (N325) after change/Z1 shaft, Z2 shaft 14: N303/immediately after change (N303) or immediately after start of first travel (N304) after change/main shaft and main-shaft C shaft 14: N332/immediately after change (N332) or immediately after start of first travel (N335) after change/main shaft and main-shaft C shaft 14: N403/immediately after change (N403) or immediately after start of first travel (N404) after change/main shaft and main-shaft C shaft 15: N329/immediately after change (N329) or immediately after start of first travel (N335) after change/Z shaft 15: N429/immediately after change (N429) or immediately after start of first travel (N432) after change/Z shaft 21: N310/whole cutting feed block/Z shaft, main shaft (Points denoted by black start in FIG. 6 are the position monitoring points described above.)

In this case, in "N329" and "N429", the Z shafts are switched between the system 1 and the system 2, and the positions of the replaced Z shafts are monitored at these points. Further, in "N332", the mode is changed from a lathe turning mode to a milling mode. The turning main shaft that holds a workpiece in the lathe turning mode to execute speed control is switched to execute position control in the milling mode as a C shaft (the main-shaft C shaft) that identifies the workpiece. Due to this configuration, the position of the C shaft immediately after the start of the first travel command (N335) of the C shaft subsequent to "N332" is monitored.

As described above, according to the numerical control device 1 of the embodiment of the present invention, because a position monitoring point can be automatically extracted without any correction of the machining program 101, the position can be easily monitored without requiring time and effort. Furthermore, because the position monitoring point is not manually designated, an erroneous designation and an omission of the designation can be prevented. Accordingly, occurrence of defective workpieces due to poor accuracy can be prevented. Further, monitoring is performed by restricting monitoring to a point requiring monitoring among travel operations, according to the type of the travel command described in a machining program, and only necessary data is monitored, for example, by changing the shaft to be monitored. Accordingly, the processing load required for monitoring is reduced, and the data size can be reduced in the case of storing monitoring data.

Furthermore, the present invention is not limited to the above embodiments and can be variously modified at the execution stage without departing from the scope thereof. Moreover, the above-described embodiments include inventions in various stages and various inventions can be extracted by appropriately combining a plurality of disclosed components. For example, even if some components are omitted from all the components illustrated in the above embodiments, the configuration in which some components are omitted can be extracted as an invention as long as the problems described in the section of Technical Problem can be solved and the effects described in the section of Advantageous Effects of Invention can be obtained. Furthermore, the components in the different embodiments may be appropriately combined.

INDUSTRIAL APPLICABILITY

As described above, the numerical control device according to the present invention is suitable to be used as a control device of a machine tool for machining workpieces with high quality.

REFERENCE SIGNS LIST 1 numerical control device, 3 machine tool, 10 operator, 21, 22 drive unit, 31 table, 32 sensor, 33 sensor signal, 101 machining program, 102 control unit, 103 position command, 104 position feedback, 105 load feedback, 111 position-monitoring point determination unit, 112 position-monitoring point data, 113 position monitoring unit, 114 log data, 115 analysis unit, 116 output unit, 121 position data, 122 load data, 125 position monitoring result, 130 input unit, 132 determination parameter, 134 monitoring parameter, 135 analysis parameter, S11 to S13, S21 to S27 step.

The invention claimed is:

1. A numerical control device comprising:
a control unit that controls a movement of a plurality of shafts of a machine tool by a position command according to a machining program and acquires position information on the shafts;
a monitoring point determination unit that determines a monitoring point, which is to be monitored, in the machining program and a monitoring shaft that is the shaft to be monitored, in accordance with a type of an instruction or an instruction related to a travel described in the machining program; and
a monitoring unit that monitors whether an error or a deviation based on the position information at the monitoring point of the monitoring shaft exceeds a predetermined threshold, wherein the control unit controls a movement of the shafts on a basis of a monitoring result of the monitoring unit, and
the numerical control device further comprises an analysis unit that presents whether a cause of the error or the deviation is a mechanical factor or a control factor on a basis of the monitoring result and that outputs an analysis result of the factor to an output unit.

2. The numerical control device according to claim 1, wherein the monitoring unit uses, as the position information at the monitoring point, a machine position of the shaft measured by a sensor installed in the machine tool and a motor position measured by a position detector installed in a motor that drives the shaft.

3. The numerical control device according to claim 1, wherein the monitoring point includes an end point or a start point of a pair of positioning travels that cause at least one of the shafts to travel in directions opposite to each other.

4. The numerical control device according to claim 1, wherein the monitoring point includes a point to stop for a predetermined time after a positioning travel or a cutting feed travel.

5. The numerical control device according to claim 1, wherein the monitoring point includes a quadrant projection point.

6. The numerical control device according to claim 1, wherein the monitoring point includes a point where it is determined that a cutting resistance is large or a change of a cutting resistance is large on a basis of a travel instruction described in the machining program.

7. The numerical control device according to claim 6, wherein
the point where it is determined that a cutting resistance is large or a change of a cutting resistance is large includes any of or a combination of:
(1) a first cutting feed travel;
(2) a last cutting feed travel;
(3) an entrance of a hole, a hole bottom, an exit of a hole;
(4) an end of a groove; and
(5) a corner portion of a pocket,
in a machining cycle.

8. The numerical control device according to claim 1, wherein the monitoring point includes a quadrant projection point or a point where it is determined that a cutting resistance is large or a change of a cutting resistance is large and where it is assumed that a speed command or an acceleration command is small.

9. The numerical control device according to claim 8, wherein the point where it is assumed that a speed command or an acceleration command is small is a point where a command channel is tangent-continuous or a direction change of a tangent is small, where a feed speed command is constant, and where a sign of speed of at least one of the shafts is reversed.

10. The numerical control device according to claim 1, wherein the monitoring point includes a point where a change of any of mass, a moment of inertia, and a speed reduction ratio of the machine tool is large.

11. The numerical control device according to claim 10, wherein
the point where a change of any of mass, a moment of inertia, and a speed reduction ratio of the machine tool is large includes any of or a combination of:

(1) immediately after a workpiece, a tool, or a jig is replaced;
(2) a point where servo control is started after replacement of a workpiece, a tool, or a jig; and
(3) a first travel after replacement of a workpiece, a tool, or a jig.

12. The numerical control device according to claim 1, wherein the monitoring point includes a machining cycle for finishing, a point where accuracy is designated, or a machining cycle for finishing and a point where accuracy is designated.

13. The numerical control device according to claim 1, wherein the monitoring point includes a point immediately after a configuration of the shaft to be controlled is changed or a first travel after the change.

14. The numerical control device according to claim 1, wherein the monitoring point includes a first travel after a control mode related to position control or speed control is changed.

15. The numerical control device according to claim 2, wherein the monitoring point includes a travel instruction to stop a travel if a sensor signal output from the sensor or a load of the motor becomes a predetermined value or falls within a predetermined range.

16. The numerical control device according to claim 1, wherein the monitoring point determination unit changes the monitoring shaft according to a type of a travel command described in the machining program.

17. The numerical control device according to claim 1, wherein when a plurality of same machining cycles are included in the machining program, the monitoring point includes a first machining, a last machining, or both the first machining and the last machining of the same machining cycles.

18. The numerical control device according to claim 1, wherein when the monitoring point is continuous over a plurality of travels of a same type, the monitoring unit performs monitoring only in a first travel, a last travel, or both the first travel and the last travel of the travels.

19. The numerical control device according to claim 1, further comprising a storage unit that records therein the position information at the monitoring point of the monitoring shaft as log data.

20. The numerical control device according to claim 19, wherein the log data includes load data on the monitoring shaft.

21. The numerical control device according to claim 1, further comprising an input unit by which an operator corrects the monitoring point and the monitoring shaft that are determined by the monitoring point determination unit and are output by the output unit, wherein
the monitoring unit performs monitoring at the corrected monitoring point of the corrected monitoring shaft.

* * * * *